(12) United States Patent
Matsuhashi

(10) Patent No.: US 6,547,045 B2
(45) Date of Patent: Apr. 15, 2003

(54) SHOCK ABSORBER

(75) Inventor: Akira Matsuhashi, Tachikawa (JP)

(73) Assignee: Metrol Co., Ltd., Tachikawa (JP)

(*) Notice: Subject to any disclaimer, the term of this patent is extended or adjusted under 35 U.S.C. 154(b) by 0 days.

(21) Appl. No.: 09/947,608

(22) Filed: Sep. 7, 2001

(65) Prior Publication Data

US 2002/0084158 A1 Jul. 4, 2002

(30) Foreign Application Priority Data

Dec. 29, 2000 (JP) ........................... 2000-405061

(51) Int. Cl.⁷ ............................. F16F 9/02; F16F 9/512; F16F 9/44
(52) U.S. Cl. ................. 188/301; 188/322.15; 188/314; 267/64.11; 267/64.14; 267/113
(58) Field of Search ................. 188/315, 314, 188/297, 301, 313, 286, 287, 299.1, 322.22, 322.15, 322.13, 316–320; 267/64.11, 64.28, 120–129, 113, 118, 114, 130, 119, 221, 226; 91/394, 416, 533, 410, 399, 396, 401, 170 R; 92/134, 151, 152, 171.1, 169.1; 16/66, 84; 293/9, 136; 296/56

(56) References Cited

U.S. PATENT DOCUMENTS

| | | | | |
|---|---|---|---|---|
| 1,488,197 A | * | 3/1924 | Demke et al. | |
| 1,544,850 A | * | 7/1925 | Messier | |
| 3,348,835 A | * | 10/1967 | Casey | |
| 3,379,430 A | * | 4/1968 | Hennells | |
| 3,979,790 A | * | 9/1976 | Chiarappa | |
| 4,190,239 A | * | 2/1980 | Schwankhart et al. | |
| 4,226,167 A | * | 10/1980 | Lew | |
| 4,500,075 A | * | 2/1985 | Tsuchiya et al. | |
| 4,759,260 A | * | 7/1988 | Lew | |
| 4,815,716 A | * | 3/1989 | Scotto | 267/64.16 |
| 5,069,317 A | * | 12/1991 | Stoll et al. | 188/299.1 |
| 6,267,360 B1 | * | 7/2001 | Matsuhashi et al. | 267/114 |
| 2002/0084158 A1 | * | 7/2002 | Matsuhashi | 188/297 |

FOREIGN PATENT DOCUMENTS

| | | | |
|---|---|---|---|
| EP | 1219855 | * | 7/2002 |
| JP | 311447 | * | 11/2001 |

* cited by examiner

Primary Examiner—Douglas C. Butler
(74) Attorney, Agent, or Firm—Kanesaka & Takeuchi

(57) ABSTRACT

In an air-type shock absorber, a piston is sealing situated in a cylinder chamber. A vacuum state occurs in a piston bearing side of the cylinder chamber when a piston is pushed. Also, an air reservoir is provided at a side opposite to the piston bearing to have a sealed structure, so that a force of absorbing a shock can be increased to have the same effect as in an oil-type shock absorber. The shock absorber can be used not only at a place requiring cleanness but also in adverse environment in which the shock absorber is exposed to water or coolant, and durability of the shock absorber is also improved.

8 Claims, 5 Drawing Sheets

Fig. 3
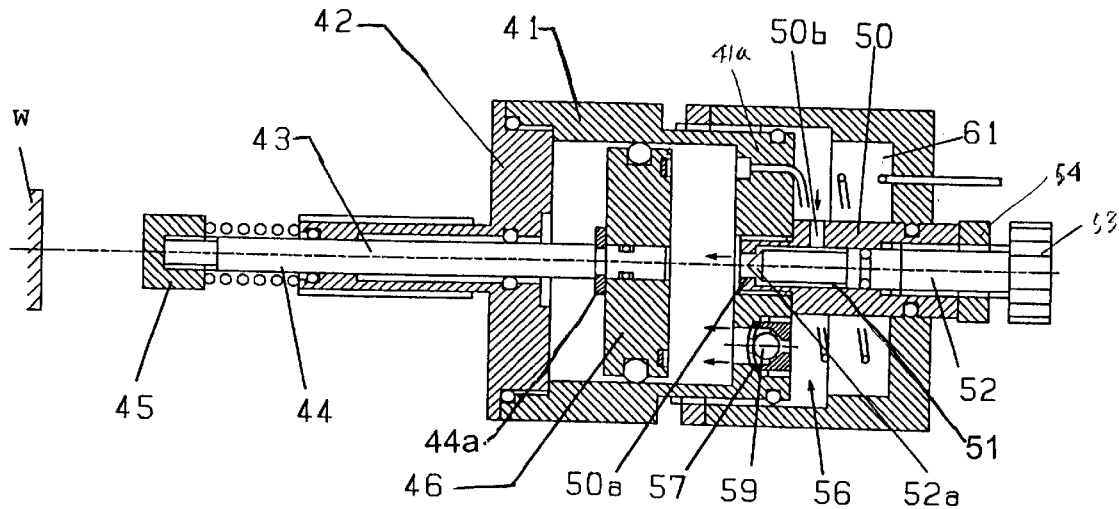
Fig. 4(a)
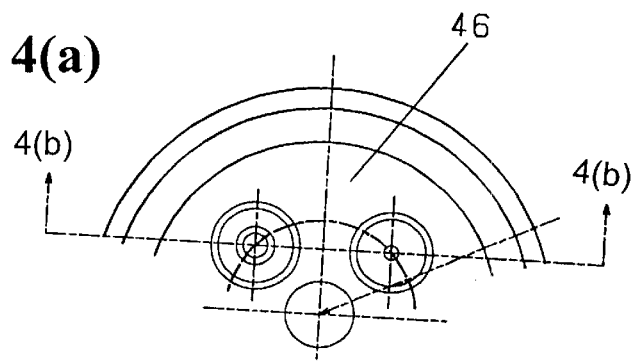
Fig. 4(b)
Fig. 4(c)
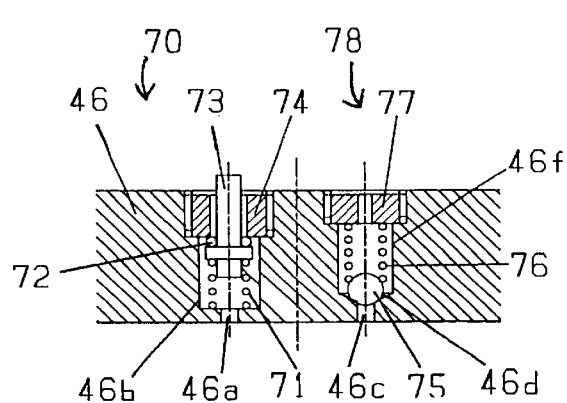

SHOCK ABSORBER

BACKGROUND OF THE INVENTION AND RELATED ART STATEMENT

The present invention relates to a shock absorber for absorbing a shock of a moving member in case the moving member, such as work, is transferred from a moving state to a stopping state.

In a conventional shock absorber, oil is used, as shown in FIG. 8 of Japanese Patent Application No. 2000-153832 (corresponding U.S. patent application Ser. No. 09/571, 593). Thus, there is a disadvantage of oil stain due to the oil leakage and oozing out of oil.

In order to eliminate the above disadvantage, a shock absorber using air has been invented, as shown in, for example, FIG. 1 through FIG. 3 of Japanese Patent Application No. 2000-153832.

FIGS. 7 through 9 generally correspond to FIGS. 1 through 3 of Japanese Patent Application No. 2000-153832, and as an example of a prior shock absorber, a shock absorber in FIGS. 7 through 9 will be briefly explained based mainly on operations thereof. From a state shown in FIG. 7, a moving member W is moved rightward, and a piston shaft 102 pressed by the moving member W slides in a piston bearing 101a to be displaced rightward, so that a piston 103 provided integrally with the piston shaft 102 compresses air in a cylinder 101 (refer to FIG. 8).

In this case, in order to prevent a space between a left end side of the piston 103 and an inner wall of a left side of the cylinder 101 from becoming a vacuum state, air flows to the left side of the piston 103 through an air extracting hole 109.

As shown in FIG. 8, air compressed by the piston 103 passes through a first air passage 116, and flows in an arrow direction for a flow quantity determined by a flow quantity control valve formed of a flow quantity control shaft 113b and a flow quantity control shaft hole 114 of a speed controller section B, and air flows backward to outside or a compressed air tank, not shown, through a second air passage 117 and a tube 118.

Furthermore, when the piston 103 reaches an inner end portion of the cylinder 101 such that the right end of the piston 103 abuts against a cylinder wall 106 or a contact 105 abuts against a left end of the piston bearing 101a, the moving member W stops while receiving cushions of air and a compressing coil spring 108.

When the pressing force of the moving member W against the piston 102 is removed, the piston 103 starts moving leftward by a reactive force of the compression coil spring 108 and an air pressure from the compression air tank (refer to FIG. 9).

In this case, as shown in FIG. 9, since air in the second air passage 117 opens a check valve 115 by resisting against the pressing force of the compression coil spring 115a such that the air in the second air passage 117 is directly sent to the first air passage 116, a large quantity of air flows in a short time regardless of the flow quantity of air determined by a slit formed by the flow quantity controlling shaft 113b and the flow quantity controlling shaft hole 114. Thus, the piston 3 is quickly displaced leftward to restore to the state shown in FIG. 7.

Incidentally, reference numeral 116a denotes a groove connecting the first air passage 116 and an air chamber 115b, and the check valve 115 can be opened without compressing air in the air chamber 115b.

In the shock absorber using air as described above, as compared to the shock absorber using oil, there might be a case that the force of absorbing a shock is insufficient in order to absorb a movement of the detecting member, and in this case, a larger-scaled shock absorber has to be used.

In view of the foregoing, an object of the invention is to provide a shock absorber, in which a force of absorbing a shock is increased to be equivalent to the shock absorber using oil, and air inside the shock absorber is airtightly confined irrespective of outside air, such that dustproof and waterproof functions are made perfect, and the shock absorber can be used in a clean room.

Further objects and advantages of the invention will be apparent from the following description of the invention.

SUMMARY OF THE INVENTION

To achieve the aforementioned objects, the present invention provides a shock absorber, which comprises: a cylinder having a cylinder chamber; a piston bearing integrally formed at one end of the cylinder to be arranged coaxially therewith; a piston slidably provided in the cylinder chamber and having a piston shaft including a distal end projecting from the piston bearing; a flow quantity control valve disposed at the other side of the cylinder; a check valve disposed at the other side of the cylinder; a through hole bored through a piston to penetrate from a piston bearing side to a side located opposite to the piston bearing; and valve means provided in the through hole. The piston shaft slidably moves in the piston bearing when the distal end thereof is pressed by a moving member, and the piston compresses air in the cylinder chamber when the piston is pushed toward the other end of the cylinder, so that a portion of the cylinder chamber located at a side of the piston bearing is made into a vacuum state.

The flow quantity control valve is provided for controlling a quantity of air flowing between the cylinder chamber and an outside of the cylinder chamber, to thereby control a force of absorbing a shock in case the piston compresses air in the cylinder chamber. The check valve is opened only when air is fed from the outside of the cylinder into the cylinder chamber in case the piston returns to an original position after the piston compressed air in the cylinder chamber, to thereby send a large amount of air rapidly. The valve means opens and closes in accordance with a movement of the piston in the cylinder chamber, to thereby increase the force of absorbing the shock.

Also, the shock absorber includes air storing means provided for storing air passing through the flow quantity control valve outside the cylinder chamber, and the air storing means is sealed to thereby increase the force of absorbing the shock. The sealed air storing means allows air in the shock absorber to be airtightly confined therein. Further, the air storing means has a capacity which is variable.

In addition, in the shock absorber as stated above, the valve means is formed of first valve means and second valve means. The first valve means is opened in case the piston approaches an end surface of the cylinder opposite to the side of the piston bearing, and the first valve means includes a valve operation shaft slidably abutting against the end surface of the cylinder opposite to the side of the piston bearing to thereby open the first valve means. The second valve means is opened only when the piston is moving toward an end surface of the cylinder in the side of the piston bearing.

Also, instead of having the sealed air storing means inside the shock absorber, the shock absorber can be provided with an air passage passing through the flow quantity controlling valve and extending between the cylinder chamber and an outside of the shock absorber. A portion of the air passage projecting outside the shock absorber can be connected to an external air chamber, or a compressed air tank.

BRIEF DESCRIPTION OF THE DRAWINGS

FIG. 3 is a front sectional view of the first embodiment showing a state in the course of returning to an original state after the operation;

FIG. 4(a) is an explanatory side view of a part of a piston as seen from a section taken along line 4(a)—4(a) in FIG. 1(a);

FIG. 4(b) is a cross sectional view taken along line 4(b)—4(b) in FIG. 4(a);

FIG. 4(c) is a cross sectional view as in FIG. 4(b), showing a state that a first valve is actuated;

DETAILED DESCRIPTION OF PREFERRED EMBODIMENTS

Figure 1A:
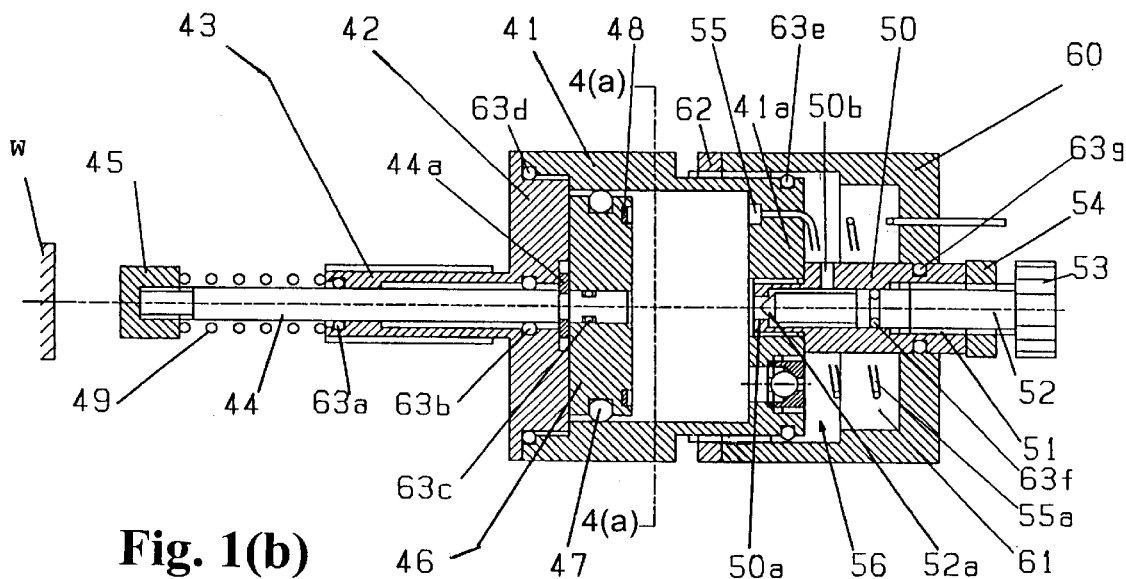
FIG. 1(a) is a front sectional view showing a first embodiment of the invention in a state before an operation.
Figure 1B:
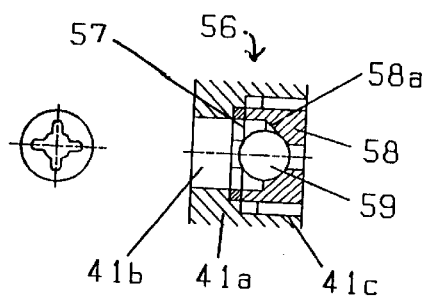
FIG. 1(b) is an enlarged view of a check valve.
Figure 2:
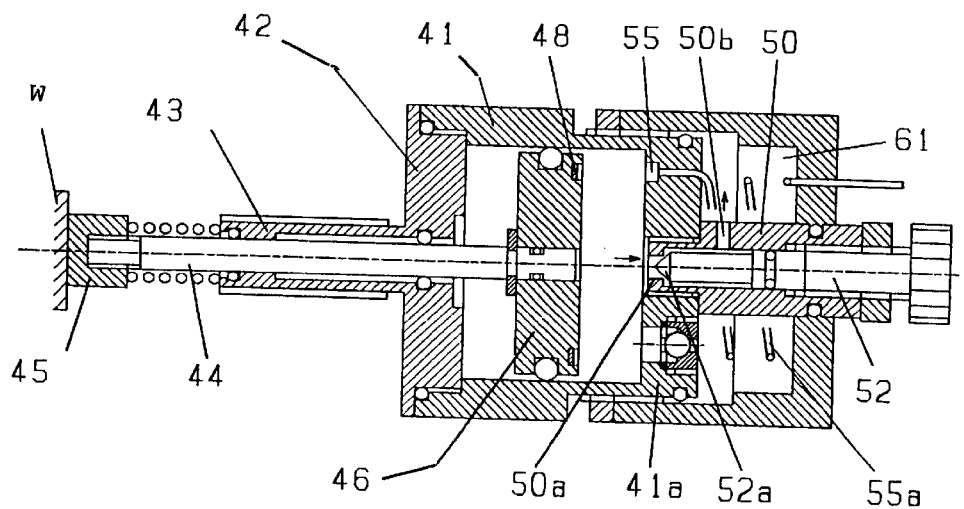
FIG. 2 is a front sectional view of the first embodiment showing a state during the operation.

FIG. 1(a) through FIG. 4(c) show structural views of a first embodiment of the invention, wherein FIG. 1(a) is a front sectional view of a shock absorber of the first embodiment in a condition that a moving member is spaced away; FIG. 1(b) is an enlarged view of a check valve; FIG. 2 is a front sectional view showing a state that a piston is pressed by the moving member to compress air in a cylinder; and FIG. 3 is a front sectional view showing a state in the course of returning of the piston to the original state, that is, the state shown in FIG. 1(a).

FIG. 4(a) is a side view of a part of the piston seen from a section taken along line 4(a)—4(a) in FIG. 1(a); FIG. 4(b) is a cross sectional view taken along line 4(b)—4(b) in FIG. 4(a); and FIG. 4(c) is a view showing a state that the first valve shown in FIG. 4(b) is actuated.

In FIG. 1(a) through FIG. 3, reference numeral 41 denotes a cylinder; 42 is a cylinder head; 43 is a piston bearing; 44 is a piston shaft; 45 is a contact; 46 is a piston; and 47 is a piston ring. The piston 46 and the piston shaft 44 are press-fitted to each other by using a retaining ring 44a. A ring shape magnet 48 is embedded at a right side of the piston 44. Reference numeral 49 is a compression coil spring which constantly attracts the piston 46 to a side of the cylinder head 42.

In a cylinder wall 41a of a right side of the cylinder 41, a flow quantity control bearing 50 is fixed by a screw, and a flow quantity control shaft 52 is screwed into a control screw 51 of the flow quantity control bearing 50. A cone portion 52a at a left distal end of the flow quantity control shaft 52 and a hole 50a at a left distal end of the flow quantity control bearing 50 form a throttle, and by turning a control knob 53, the throttle can be controlled. Reference numeral 54 denotes a double nut for fixing the control knob 53, and 50b is an air hole for a bypass.

Numeral 55 is a non-contact switch, which outputs an abutment signal through a lead 55a when the magnet 48 approaches the non-contact switch 55. The magnet 48 and the non-contact switch may be omitted.

Reference numeral 56 denotes a check valve, and an enlarged view thereof is shown in FIG. 1(b). Namely, a hole 41b is formed at a left side of the cylinder wall 41a, and a screw 41c is provided at a right side of the cylinder wall 41a. Then, a thin plate spring 57 is held by a valve seat nut 58. A ball 59 is inserted between a conical hole 58a of the valve seat nut 58 with a cross-shaped hole and the thin plate spring 57, and the ball 59 is always slightly pressed by the plate spring 57 to close the conical hole 58a.

Reference numeral 60 is an air reservoir cover, which is screwed into the cylinder 41 to form an air reservoir 61 between the cylinder wall 41a and the air reservoir cover. In the air reservoir 61, by rotating the air reservoir cover 60, a capacity of the air reservoir 61 can be changed.

Reference numeral 62 is a double nut for fixing the position of the air reservoir cover 60. Reference numerals 63a, 63b, 63c, 63d, 63e, 63f and 63g denote O-rings, which are attached to maintain airtightness.

In explaining FIGS. 4(a) through 4(c), FIG. 4(a) is a side view of a part of the piston 46 seen from a section taken along line 4(a)—4(a) in FIG. 1(a), and FIG. 4(b) is a cross sectional view taken along line 4(b)—4(b) in FIG. 4(a). Holes 46a and 46b are bored in the piston 46, and an operation shaft 73, wherein a compression coil spring 71 and an O-ring 72 are fitted, is stored in the hole 46 and fastened by a nut 74 to thereby form a first valve 70.

Further, a hole 46c, a conical hole 46d, and a hole 46f are bored in the piston 46, and a ball 75 and a compression coil spring 76 are stored in the conical hole 46d and fastened by a nut 77, to thereby form a second valve 78.

Next, operations of the shock absorber of the first embodiment will be explained. In FIG. 1(a), the moving member W is moved rightward, and the piston 44 pressed by the moving member W slides in the piston bearing 43 to be displaced rightward. Then, as shown in FIG. 2, the piston 46 integral with the piston shaft 44 compresses air in the cylinder 41.

Air compressed by the right end side (pushing side) of the piston 46 passes through the throttle formed by the cone portion 52a at the left distal end of the flow quantity control shaft 52 and the hole 50a at the left distal end of the flow quantity control bearing 50, and air enters the air reservoir 61 from the air hole 50b as the bypass (refer to the arrow in FIG. 2).

In this case, since a space between the left end side (pulling side) of the piston 46 and the cylinder head 42 is in a vacuum state, the force of absorbing the shock is increased. Further, when the piston 46 is displaced rightward, the vacuum state between the left end side (pulling side) of the piston 46 and the cylinder head 42 is further intensified, to thereby apply brake on the moving member W. Accordingly, the piston 46 gradually approaches the cylinder wall 41a, and the operation shaft 73 shown in FIG. 4(b) abuts against the cylinder wall 41a to slide inside the piston 46, so that the first valve 70 is opened as shown in FIG. 4(c). Accordingly, air compressed by the right end side (pushing side) of the piston 46 flows into the space between the left end side (pulling side) of the piston 46 and the cylinder head 42, which is in the vacuum state, to thereby prevent the brake effect from being excessive, so that a soft contact can be carried out.

When the ring magnet 48 of the piston 46 approaches the non-contact switch 55, the switch 55 outputs the abutment or contact signal to send the contact signal to an outer control device through the lead 55a.

After the contact of the piston 46, when the moving member W is returned to the position shown in FIG. 1(a), the piston 46 starts to restore (FIG. 3), and the ball 59 of the check valve 56 is displaced leftward to push the thin plate spring 57 to the left, so that the check valve 56 is opened. Accordingly, a large quantity of air is sent in a short time from the air reservoir 61 into the cylinder 41, so as to accelerate the returning time of the piston 46.

Needless to say, air in the air reservoir 61 flowing from the air hole 50b of the bypass passes also through the throttle formed by the cone portion 52a at the left distal end of the flow quantity control shaft 52 and the hole 50a at the left distal end of the flow quantity control bearing 50, and flows into the cylinder 41.

As described above, the first valve 70 of the piston 46 is opened, and air compressed by the right end side (pushing side) of the piston 46 flows into the space, which is in the vacuum state, between the left end side of the piston 46 and the cylinder head 42, to thereby ease the vacuum state. Thus, air is introduced into the space between the left end side (pulling side) of the piston 46 and the cylinder head 42, so that the second valve 78 of the piston 46 is naturally opened at the time of restoring the piston 46. In case that the piston 46 is restored to the state shown in FIG. 1(a), there is no air between the piston 46 and the cylinder head 42.

Figure 5:
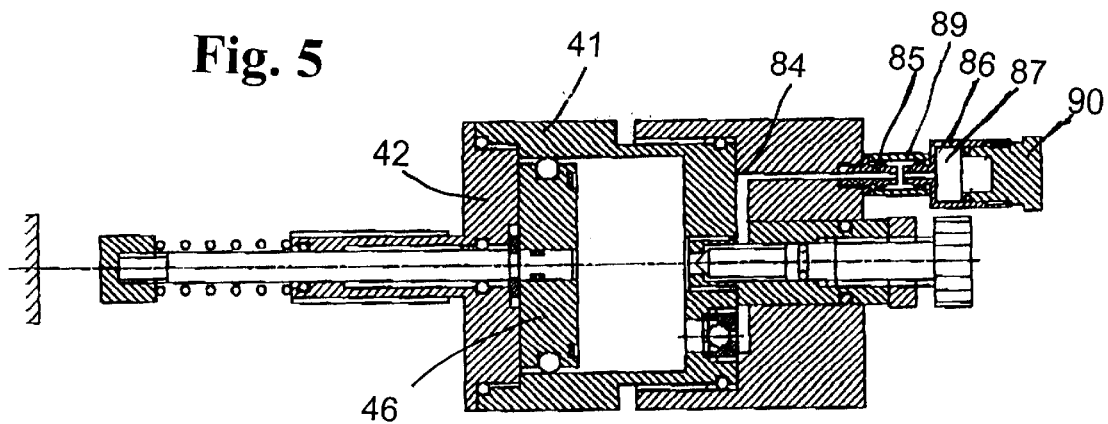
FIG. 5 is a front sectional view of a second embodiment of the invention.

FIG. 5 is a front sectional view of a shock absorber according to a second embodiment of the invention. As compared with the shock absorber of the first embodiment in which the air reservoir 61 is provided inside the air reservoir cover 60, the shock absorber of the second embodiment is provided with an air passage 84, which is communicated with an outside of the shock absorber and the cylinder chamber through the air hole 50b as the bypass, and an air joint portion 85 is attached to an outlet of the air passage 84 projecting outside the shock absorber. A chamber 86 whose capacity is adjustable is provided to the outside of the shock absorber, to thereby form an external air reservoir 87.

Namely, the external air reservoir 87 is detachably attached to the air passage 84 by a tube 89, and includes a control screw 91 to adjust a capacity of the air reservoir 87. Since the capacity of the reservoir 87 is adjustable by a controlling screw 90, the shock absorbing ability when the piston is being moved can be adjusted.

Also, other than the aforementioned method of controlling the capacity of the air reservoir, there can be used a method of replacing the chamber with another chamber of a fixed quantity having a different inner diameter and length. Further, without using the chamber 86, the air joint portion 85 can be opened to the atmosphere, to thereby reduce the force of absorbing the shock. Also, the shock absorber can be connected to a compressed air source, not shown, to thereby increase the force of absorbing the shock.

Figure 6:
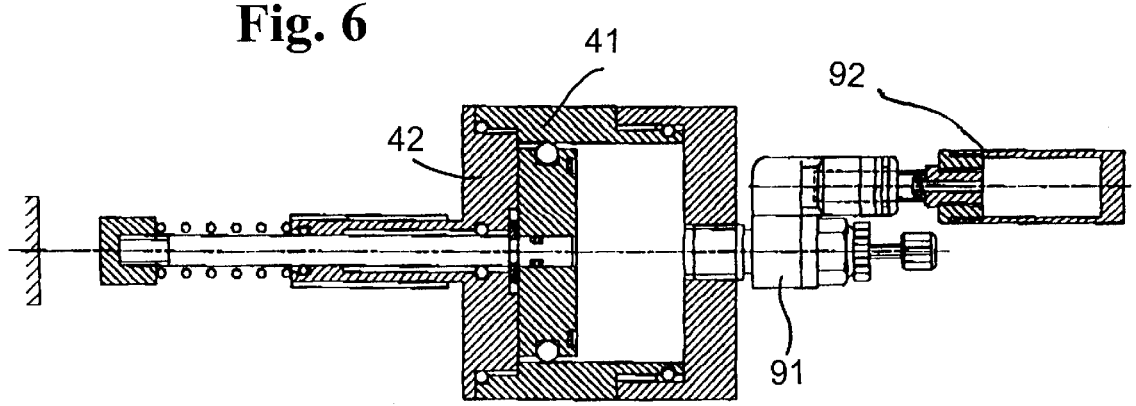
FIG. 6 is a front sectional view of a third embodiment of the invention.
Figure 7:
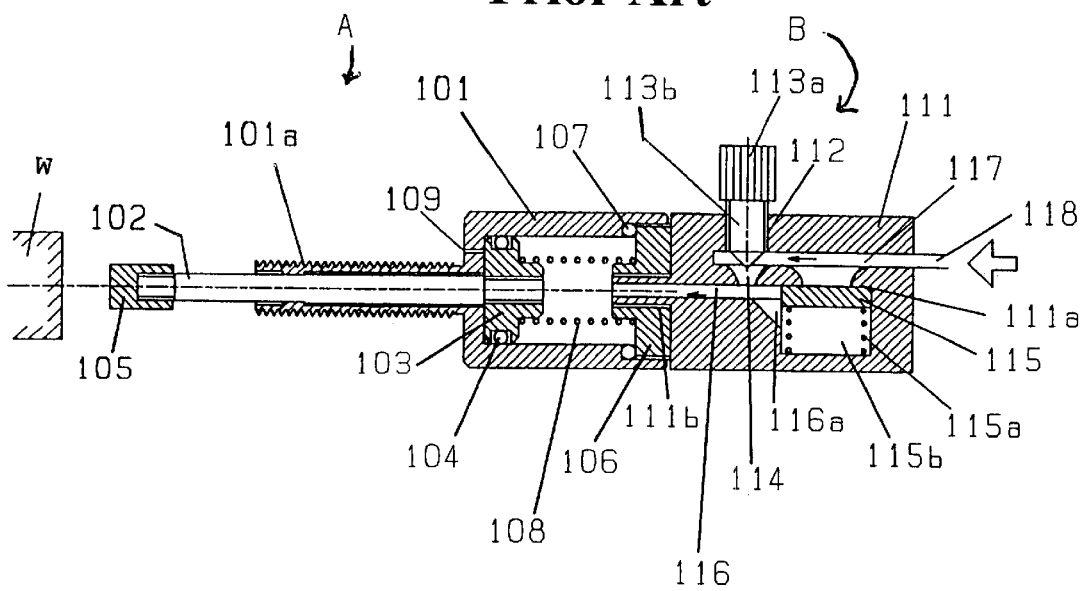
FIG. 7 is a front sectional view of a prior shock absorber showing a state before an operation.
Figure 8:
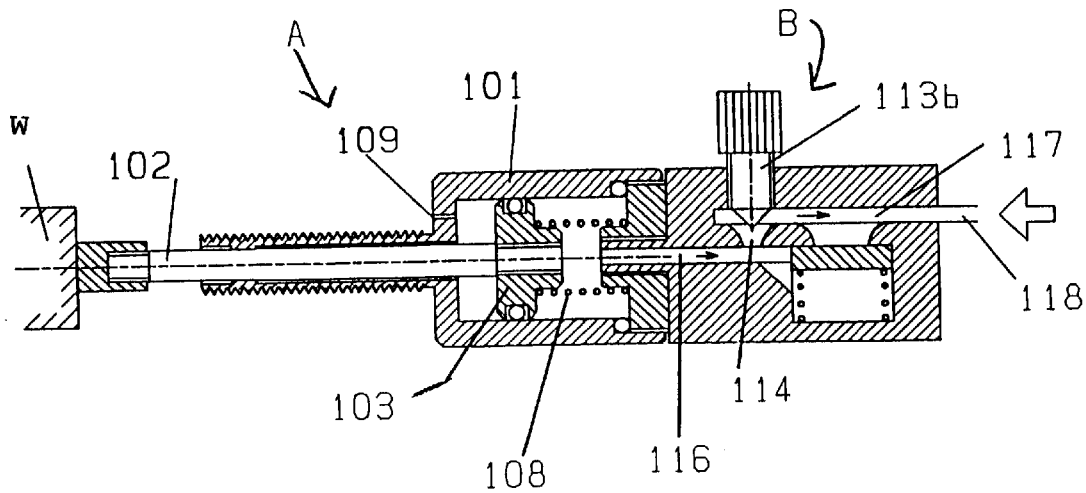
FIG. 8 is a front sectional view of the prior shock absorber showing a state during the operation.
Figure 9:
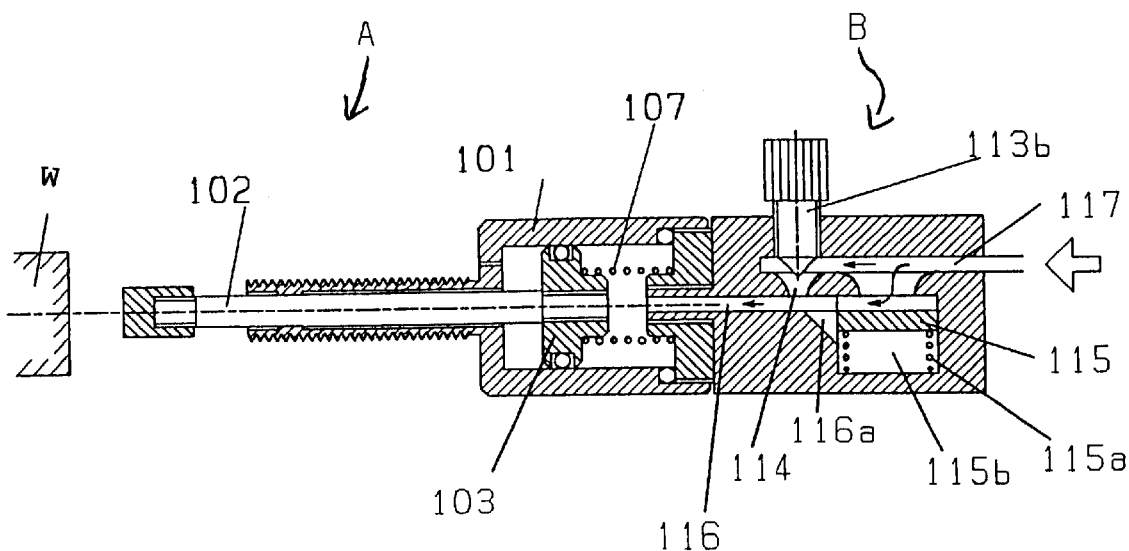
FIG. 9 is a front sectional view of the prior shock absorber showing a state in the course of returning to an original state after the operation.

FIG. 6 shows a front, partly sectional view of a shock absorber of a third embodiment of the invention. In the shock absorber of the first embodiment, the flow quantity control shaft 52 and the check valve 56 are used, but a speed controller, which is available in the market, has functions corresponding to the flow quantity control shaft 52 and the check valve 56. Thus, in the shock absorber of the third embodiment, instead of the flow quantity control shaft 52 and the check valve 56, a speed controller 91 is attached to the cylinder wall 41a, to thereby achieve the object of the invention.

The speed controller 91 includes therein an air hole corresponding to the air hole 50b in the first embodiment at one side of a casing of the speed controller 91. An air chamber 92 is directly joined to a path communicating with the air hole from the speed controller. The air chamber 92 is formed similar to the second embodiment. Accordingly, the third embodiment operates as in the first embodiment.

Figure 10:
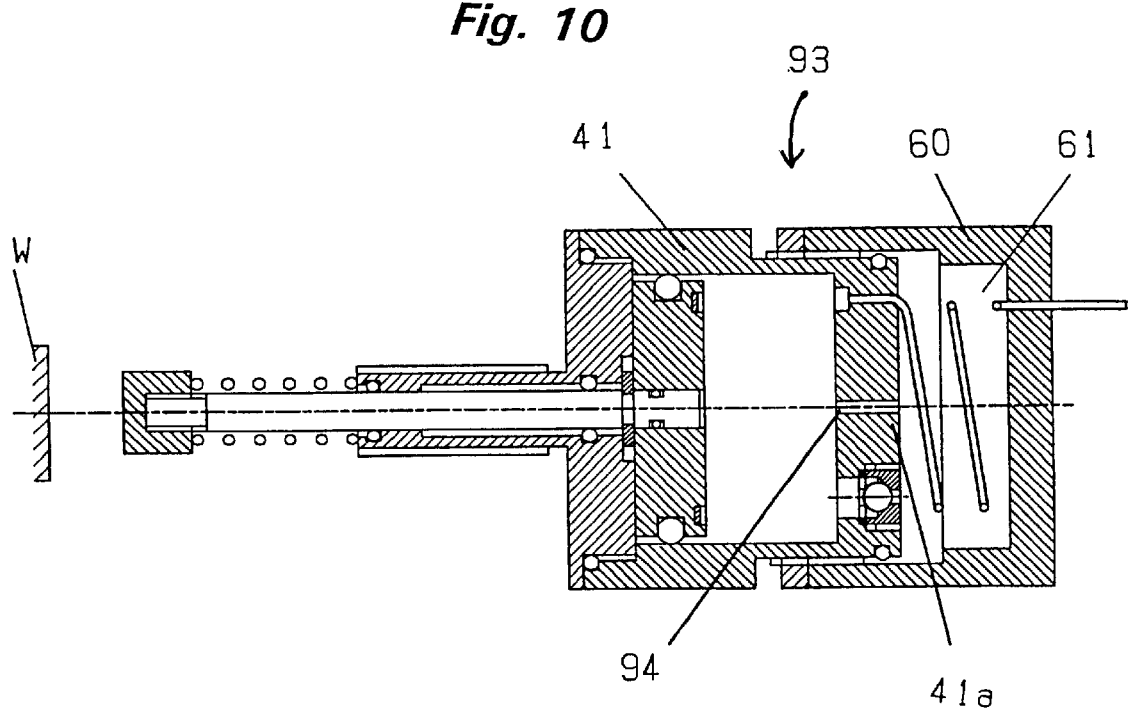
FIG. 10 is a front sectional view of a fourth embodiment of the invention.

FIG. 10 shows a front, partly sectional view of a shock absorber 93 of a fourth embodiment of the invention. In the shock absorber of the first embodiment, the flow quantity control bearing 50 is fixed to the cylinder wall 41a to adjust the flow quantity from the compression side of the cylinder to the air chamber 61. However, in the fourth embodiment, a throttle hole 94 is simply formed in the cylinder wall 41a. Since the cover 60 for the air chamber 61 can be adjusted relative to the cylinder 41, shock absorbing ability of the shock absorber 93 can be adjusted. The shock absorber 93 operates as in the first embodiment.

According to the first to fourth embodiments (FIG. 1(a) to FIG. 6 and FIG. 10) of the invention, the shock absorbers employ an air system while the conventional shock absorber employs an oil system. Since air used in the shock absorber is not given to or received from the outside at all, air can be airtightly confined in the shock absorber. Thus, the shock absorbers of the embodiments are excellent in dustproof and oilproof functions, and can be used in a clean room.

There was a case that the force of absorbing the shock in the conventional shock absorber using air is deficient in order to absorb the movement of the detecting member as compared with the conventional oil-type shock absorber. However, in the shock absorber according to the present invention, since the suction force of the piston due to the vacuum state caused between the pulling side of the piston and the cylinder is added to the resistance force of air compressed by the pushing side of the piston and the cylinder, the absorbing force which is sufficient for absorbing the movement of the detecting member can be obtained.

Also, in the shock absorber according to the present invention, a degree of absorbing the shock can be controlled by a method of varying both the flow quantity controlling valve and the capacity of the air chamber, or by a method of varying either of them. Accordingly, the shock absorber, in which both the flow quantity controlling valve and the capacity of the air chamber are controllable, can be used widely, and the shock absorber in which either of the above is controllable can be used for an exclusive purpose, so that it can be very handy in some cases.

While the invention has been explained with reference to the specific embodiments of the invention, the explanation is illustrative and the invention is limited only by the appended claims.

What is claimed is:

1. A shock absorber, comprising:
 a cylinder having a cylinder chamber,
 a piston bearing formed at one side of the cylinder,
 a piston slidably situated in the cylinder chamber and including a piston shaft slidably held at the piston bearing and having a distal end projecting from the piston bearing, said piston, when the distal end is pressed by a moving member, slidably moving in the cylinder chamber to form a compression side of the cylinder for compressing air and a vacuum side at a side of the piston shaft, a flow quantity control valve attached to the compression side of the cylinder for controlling a quantity of air flowing from the compression side to thereby control a force of absorbing a shock in case the piston compresses air at the compression side of the cylinder chamber, a check valve attached to the compression side of the cylinder, said check valve being opened only when a large amount of air is rapidly fed to the compression side of the cylinder chamber in case the piston returns to an original position after compressing air in the cylinder chamber, a through hole formed in the piston to penetrate between the compression side and the vacuum side, and valve means formed in the through hole for opening and closing the through hole in accordance with a movement of the piston in the cylinder chamber to thereby increase the force of absorbing the shock.

2. A shock absorber according to claim 1, further comprising air storing means connected to the flow quantity control valve for storing the air passing through the flow quantity control valve, said storing means being sealed to thereby increase a force of absorbing the shock and allowing the air in the shock absorber to be airtightly confined therein.

3. A shock absorber according to claim 2, wherein said air storing means has a variable capacity.

4. A shock absorber according to claim 3, wherein said air storing means includes a cover slidably attached to the cylinder to form an air chamber between the cover and the cylinder.

5. A shock absorber according to claim 3, wherein said air storing means includes a base fixed to the cylinder and a cover slidably attached to the base to form an air chamber between the base and the cover.

6. A shock absorber according to claim 1, wherein said valve means includes first valve means opened in case the piston approaches an end surface of the cylinder opposite to the side of the piston bearing, and second valve means opened when the piston is moving toward an end surface of the cylinder in the side of the piston bearing.

7. A shock absorber according to claim 6, wherein said first valve means includes a valve operation shaft to abut against the end surface of the cylinder opposite to the side of the piston bearing to thereby open the first valve means to allow air in the compression side to the vacuum side.

8. A shock absorber according to claim 1, wherein said flow quantity control valve is a fixed valve which cannot change a flow rate or a variable valve which can change a flow rate.

* * * * *